(12) United States Patent
Song

(10) Patent No.: US 9,746,704 B2
(45) Date of Patent: Aug. 29, 2017

(54) SUPPORT STRUCTURE AND LIQUID CRYSTAL DISPLAY DEVICE INCLUDING THE SAME

(71) Applicant: LG DISPLAY CO., LTD., Seoul (KR)

(72) Inventor: Eun Seok Song, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/875,236

(22) Filed: Oct. 5, 2015

(65) Prior Publication Data

US 2016/0103357 A1 Apr. 14, 2016

(30) Foreign Application Priority Data

Oct. 14, 2014 (KR) .................. 10-2014-0138650

(51) Int. Cl.
*G02F 1/1333* (2006.01)
*G02F 1/1335* (2006.01)

(52) U.S. Cl.
CPC .. *G02F 1/133308* (2013.01); *G02F 1/133385* (2013.01); *G02F 2001/133311* (2013.01); *G02F 2001/133317* (2013.01); *G02F 2001/133628* (2013.01)

(58) Field of Classification Search
CPC ................. G02F 1/133308; G02F 1/133385
See application file for complete search history.

(56) References Cited

U.S. PATENT DOCUMENTS 6,929,239 B1 * 8/2005 Colin ................ B01L 3/502738
251/115

* cited by examiner

*Primary Examiner* — Anne Hines
(74) *Attorney, Agent, or Firm* — Birch, Stewart, Kolasch & Birch, LLP

(57) ABSTRACT

Discussed is an LCD device including a specifically configured support structure with two or more supporting parts and containing a heat-resistant material in at least one supporting part thereof. The content of the heat-resistant material included in the supporting part adjacent to a light source of the LCD device can be higher than the content of heat-resistant material included in the other supporting parts.

16 Claims, 8 Drawing Sheets

SUPPORT STRUCTURE AND LIQUID CRYSTAL DISPLAY DEVICE INCLUDING THE SAME

CROSS-REFERENCE TO RELATED APPLICATIONS

This application claims the priority benefit of the Korean Patent Application No. 10-2014-0138650 filed on Oct. 14, 2014, which is hereby incorporated by reference as if fully set forth herein.

BACKGROUND

Field of the Invention

The present invention relates to a liquid crystal display (LCD) device, and more particularly, to an LCD device including a support structure.

Discussion of the Related Art

Generally, LCD devices adjust the light transmittance of liquid crystals having dielectric anisotropy by using electric fields applied thereto to display images. An LCD device includes a liquid crystal panel where a plurality of display pixels are arranged in a matrix type, a guide panel where the liquid crystal panel is accommodated, and a backlight unit that irradiates light onto the liquid crystal panel.

The backlight unit can be classified as a direct type and an edge type depending on the position of the light source. The direct type is a type where the light source is disposed on a rear surface of the liquid crystal panel, and the edge type is a type where the light source is disposed on a side surface (or along an edge) of the liquid crystal panel. Light-emitting diodes (LEDs) are typically used as the light source of the backlight unit. This is because LEDs have high luminance and low consumption power in comparison with fluorescent lamps.

The light source of the backlight unit generates much heat when the display device is being driven. The heat generated from the light source can affect the guide panel, causing defects such as the LCD device being deformed and light being undesirably leaked.

SUMMARY

The present inventor recognized the need for a support structure that addresses such problems and other limitations associated with the related art. Accordingly, the present invention is directed to provide an LCD device including a particular support structure (e.g., guide panel) that substantially obviates one or more problems due to limitations and disadvantages of the related art.

An aspect of the present invention is directed to provide a support structure and an LCD device including the same, which eliminate or minimize deformation of the support structure that can be caused by heat generated from a light source of a backlight.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a support structure including: first to fourth supporting parts; and a heat-resistant particle.

In another aspect of the present invention, there is provided an LCD device including a support structure which includes: first to fourth supporting parts; and a heat-resistant material, wherein at least one of the first to fourth supporting parts is disposed adjacent to a light source, and a content of a heat-resistant material included in the at least one supporting part is higher than a content of a heat-resistant material included in at least one of the other supporting parts.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

The terms described in the specification should be understood as follows. As used herein, the singular forms "a", "an" and "the" are intended to include the plural forms as well, unless the context clearly indicates otherwise. The terms "first" and "second" are for differentiating one element from the other element, and these elements should not be limited by these terms. It will be further understood that the terms "comprises", "comprising", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. The term "at least one" should be understood as including any and all combinations of one or more of the associated listed items. For example, the meaning of "at least one of a first item, a second item, and a third item" denotes all combinations of all items proposed from two or more of the first item, the second item, and the third item as well as the first item, the second item, or the third item. The term "on" should be construed as including a case where one element is formed at a top of another element and moreover a case where a third element or multiple elements are disposed therebetween.

Hereinafter, a support structure and an LCD device including the same according to embodiments of the present invention will be described in detail with reference to the accompanying drawings.

Figure 1:
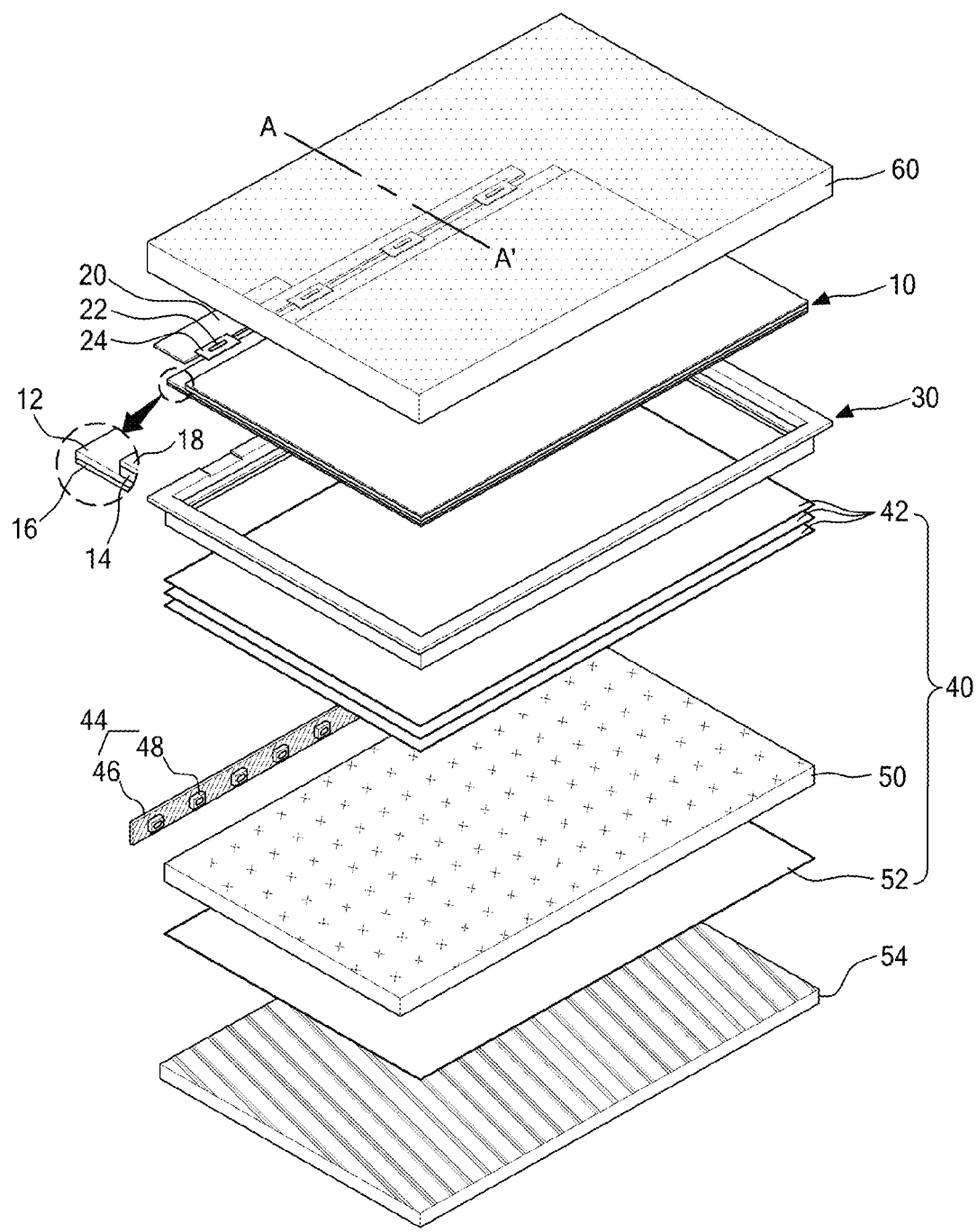
FIG. 1 is an exploded perspective view schematically illustrating an LCD device according to a first embodiment of the present invention.
Figure 2:
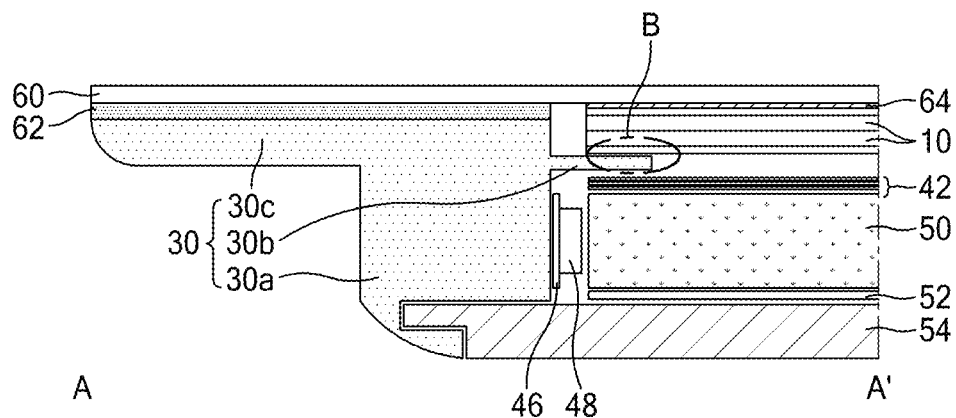
FIG. 2 is a cross-sectional view taken along line A-A' of FIG. 1 illustrating the LCD device.

FIG. 1 is an exploded perspective view schematically illustrating an LCD device according to a first embodiment of the present invention. FIG. 2 is a cross-sectional view taken along line A-A' of FIG. 1 illustrating the LCD device.

Referring to FIGS. 1 and 2, the LCD device according to the first embodiment of the present invention includes a backlight unit 40, a cover bottom 54, a support structure 30, a liquid crystal panel 10, a panel driver, and a cover glass 60. All components of the LCD device in this and all other embodiments disclosed herein are operatively coupled and configured.

The backlight unit 40 may include a light guide panel 50, a reflective sheet 52, a plurality of optical sheets 42, and an LED module array 44. The light guide panel 50 may have a plate shape and receive light from the LED module array 44 through an edge or side surface thereof. The light guide panel 50 may diffuse the light incident through the side surface and irradiate the diffused light onto a front surface. The plurality of optical sheets 42 may be disposed on the light guide panel 50, and the reflective sheet 52 may be disposed on a rear surface of the light guide panel 50. The reflective sheet 52 may reflect the light, which is irradiated from the rear surface of the light guide panel 50, to the light guide panel 50, thereby enhancing light efficiency. The plurality of optical sheets 42 enhance a luminance characteristic of the light which travels from a front direction of the light guide panel 50 to the liquid crystal panel 10. To this end, the plurality of optical sheets 42 may include at least one diffusive sheet and at least one light collecting sheet or may include a complex sheet which is configured by a combination of a diffusive sheet and a light collecting sheet. The LED array module 44 may include a light source printed circuit board (PCB) 46, which is attached to the inside of a side wall 30a or edge of the support structure 30, and a plurality of LEDs 48 which are mounted on the light source PCB 46. The LEDs 48 may irradiate light onto the side surface of the light guide panel 50 in response to a driving signal supplied through the light source PCB 46.

The cover bottom 54 may have a plate shape and support the backlight unit 40. The cover bottom 54, as illustrated in FIG. 2, may be inserted into the side wall 30a of the support structure 30 and coupled thereto.

The support structure 30 may have a tetragonal frame shape and include a stepped portion 30b which has a stair shape to support the liquid crystal panel 10. In detail, as illustrated in FIG. 2, a cross-sectional surface of the support structure 30 may include the side wall 30a, the stepped portion 30b which protrudes in an inner direction (a direction of the liquid crystal panel 10) from the side wall 30a, and an extension portion 30c which protrudes an outer direction from an uppermost surface of the side wall 30a. The stepped portion 30b of the support structure 30 may support the liquid crystal panel 10. In the present embodiment, the frame-like shape of the support structure 30 illustrated in FIG. 1 is merely an example, but is not limited thereto. That is, if the support structure 30 according to an embodiment of the present invention includes a supporting surface or panel for supporting the liquid crystal panel 10, the support structure 30 may have other types of shapes.

The support structure 30 according to the first embodiment may include heat-resistant particles or materials for preventing or minimizing the support structure 30 from being deformed by heat generated from the LED array module 44. The heat-resistant particles may be in the form of glass fiber, carbon fiber, aramid fiber, etc. or some combination thereof. The heat-resistant particles may be of glass fibers, which are selected among various materials due to its efficiency of providing thermal stiffness for the support structure 30 at relatively low cost. Therefore, in the following description, the heat-resistant particles in the form of glass fibers shall be referred to merely for explaining the embodiments, although various other types of materials can also be employed.

The liquid crystal panel 10 may include an upper substrate 14, a lower substrate 12, and a liquid crystal layer disposed between the upper substrate 14 and the lower substrate 12. The liquid crystal layer may be sealed by bonding the upper substrate 14 to the lower substrate 12 with a seal along an outer periphery of the liquid crystal panel 10. A plurality of polarization layers 16 and 18 may be respectively provided at a lower portion and an upper portion of the liquid crystal panel 10.

The panel driver (or other type of controller) may include a driving PCB 20 (or other component accommodating the necessary circuitry) which is disposed on one side of the liquid crystal panel 10, a circuit film 24 (or other interconnection means) which connects the driving PCB 20 to the liquid crystal panel 10, and a driving integrated circuit (IC) 22 (or other type of circuitry) which is mounted on the circuit film 24.

The cover glass 60 may be formed of a substantially transparent material which covers most or the entire surface of the liquid crystal panel 10. The cover glass 60 may be attached or mounted in various ways, such as being attached to the extension portion 30c and the uppermost surface of the side wall 30a of the support structure 30 by an adhesive 62. An adhesive film 64 may be provided between the cover glass 60 and the liquid crystal panel 10, and thus, the cover glass 60 may be attached to the whole surface of the liquid crystal panel 10.

As described above, in the LCD device according to the first embodiment of the present invention, the glass fibers included in the support structure 30 can effectively minimize deformations due to heat generated from the LED array module 44.

Figure 3:
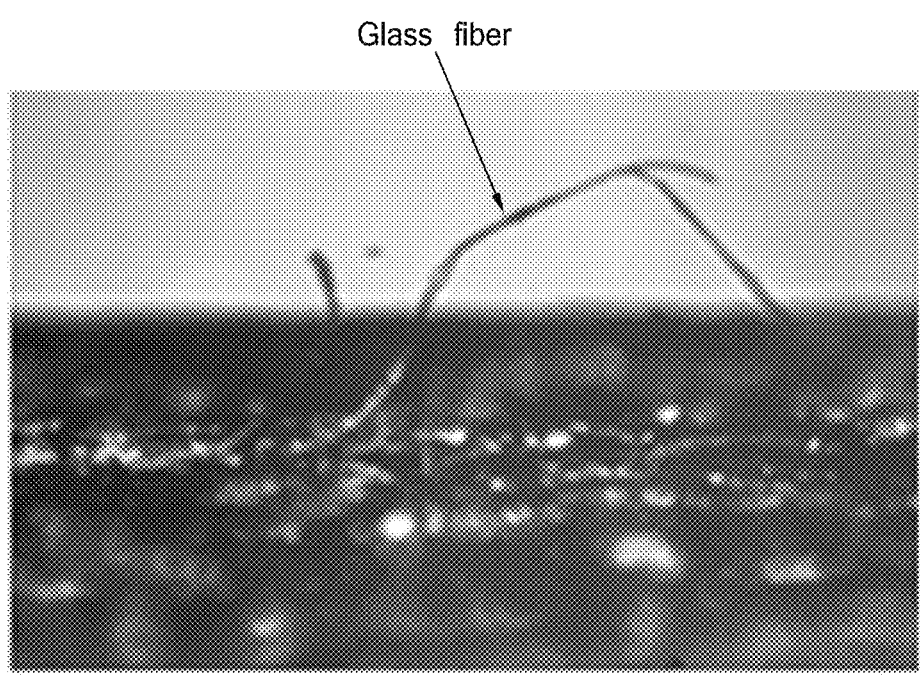
FIG. 3 is a photograph showing a glass fiber which finely protrudes from a surface of the support structure.

Typically, as the content of glass fiber increases, a thermal stiffness of the support structure 30 is enhanced. However, as illustrated in FIG. 3, the present inventor has observed that when the content of glass fiber is higher than about 40 wt %, the amount of glass fiber which finely protrudes from a surface of the guide panel 30 increases. Therefore, undesirable debris (or foreign matter) in the form of the protruding glass fibers being detached or broken off by friction with peripheral elements in the display device or due to other causes could enter the gaps (an area B illustrated in FIG. 2) between the liquid crystal panel 10 and the stepped portion 30b of the guide panel 30. Such debris or foreign material can cause damage and thus reduces the reliability of the end product. Therefore, in the support structure 30 according to an embodiment of the present invention, the content of glass fiber may be restricted to about 40 wt % in order to reduce the chance of such debris from being created.

Here, it should be noted that the glass fiber (or other heat-resistant material) amount need not be based in weight percentage (wt %), but some other types of measurements, such as volume, concentration, etc. can also be the basis of controlling the desired amount to be employed.

Also, the present inventor recognized that an optimal balance needs to be achieved between structural integrity maintaining effect in view of debris causing effect. Such desired balance and optimal amount will depend upon various factors, such as the screen size of the end product, the environment conditions in which the end product is to be subject to, the usage conditions of the end product, and the like.

For example, if the features of the present invention (i.e., the particular support structure having glass fibers) are to be implemented in a navigation display screen (or other type of visual information output panel) in an automobile or vehicle, consideration of the potentially high heat conditions within an automobile need to be accounted for and a relatively high amount of glass fiber content could be desirable. However, due to the mobility and movement nature of vehicles, the chance of debris being created from too much glass fiber included in the support structure could be problematic.

As another example, for applications that require the display device to be turned on for a prolonged period of time but mounted in a static environment, such as in some sort of commercial advertisement setting, billboard, or signage, the heat generation issue would be more significant that possible glass fiber debris creation. As such, in such display applications, the glass fiber content within the support structure may be set to be higher than other less heat resistive demanding situations.

Figure 4:
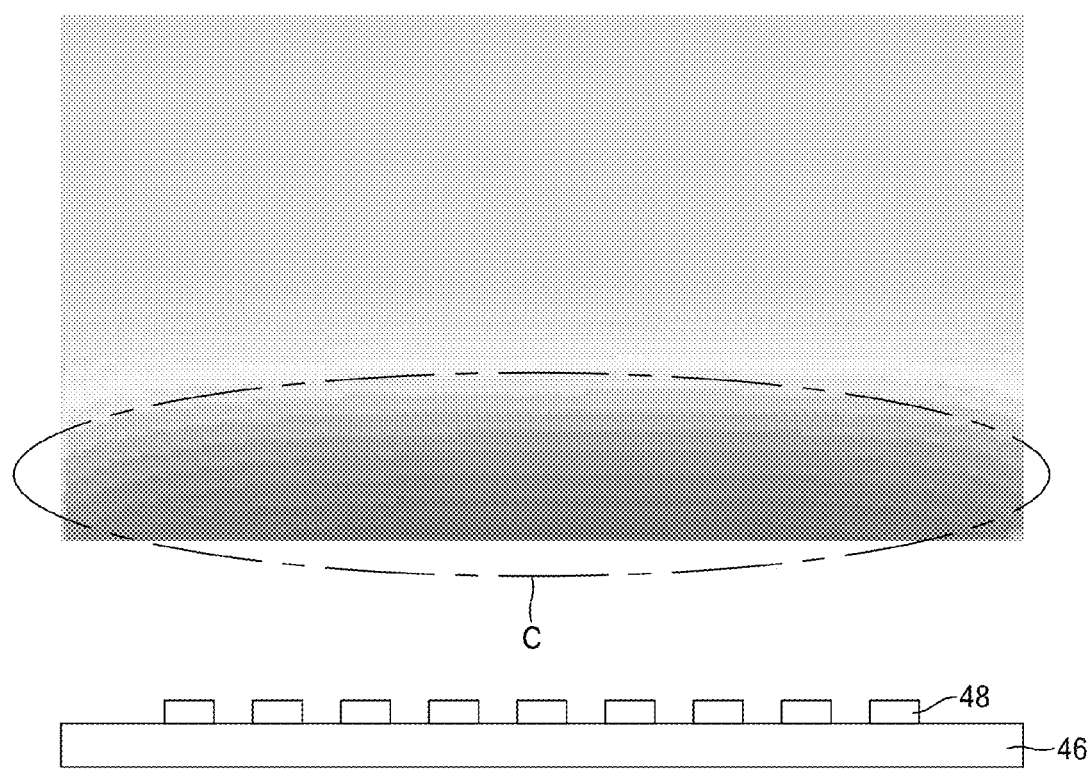
FIG. 4 shows a simulation result obtained by measuring heat which is generated when the LCD device is being driven according to an embodiment of the present invention.

As illustrated in FIG. 4, heat which is generated when the LCD device is being driven concentrates on an area (an area C in FIG. 4) adjacent to the LED array module 44, and thus, the specific content of glass fiber included in the support structure 30 may be selectively adjusted. That is, in another embodiment of the present invention to be described below, the content of glass fiber included in the support structure 30 may be relatively higher in the area adjacent to the LED array module 44 and may be relatively lower in an area which is not adjacent to the LED array module 44. That is, the glass fiber (or other heat resistive material) need not be uniformly formed or be included in the same amount in all parts of the support structure 30. Hereinafter, another embodiment of the present invention will be described in more detail.

Figure 5:
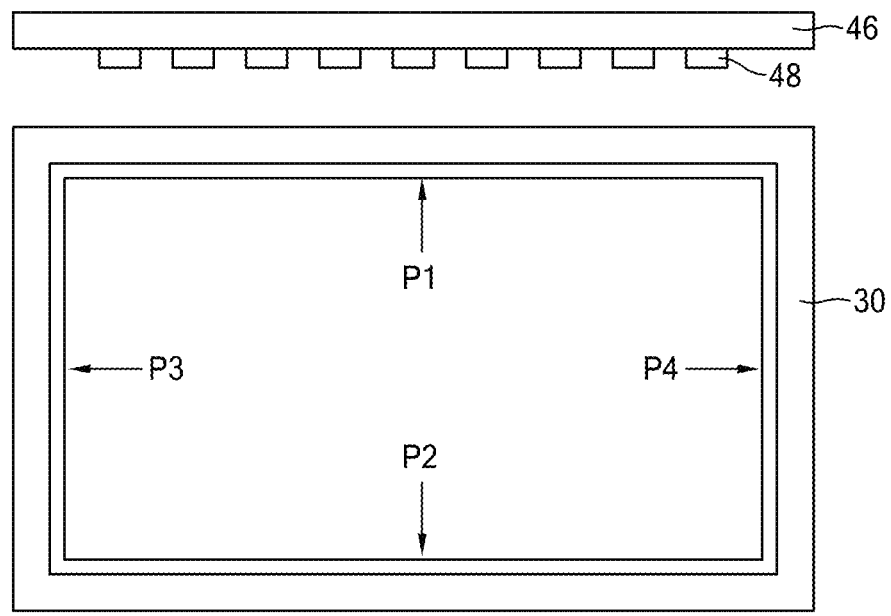
FIG. 5 is a plan view schematically illustrating an LED array module and the support structure illustrated in FIG. 1.

FIG. 5 is a plan view schematically illustrating the LED array module 44 and the support structure 30 illustrated in FIG. 1. In FIG. 5, for convenience of description, the LED array module 44 is illustrated as being separated from the support structure 30, but an actual coupling structure of the LED array module 44 and the support structure 30 is as illustrated in FIG. 2.

Referring to FIG. 5, the support structure 30 may be divided into first to fourth supporting parts P1 to P4 to correspond to the respective border areas of the rectangular liquid crystal panel 10. If the liquid crystal panel is non-rectangular, the corresponding support structure can also be non-rectangular or can have an appropriate shape that provides the required support of the liquid crystal panel.

The first supporting part P1 may be disposed adjacent to the LED array module 44, and the second supporting part P2 may be disposed to oppose or face the first supporting part P1. The third supporting part P3 may be disposed on one side of each of the first and second supporting parts P1 and P2, and the fourth supporting part P4 may be disposed on the other side of each of the first and second supporting parts P1 and P2. As such, the four supporting parts P1 to P4 can have an overall frame-like attachment configuration, but the overall shape need not be limited to this exemplary structure.

According to another embodiment of the present invention, the guide panel 30 may be divided into the first to fourth supporting parts P1 to P4, and at least one of the first to fourth supporting parts P1 to P4 which is disposed adjacent to the LED array module 44 may contain a higher content of glass fiber than the other supporting parts. For example, as illustrated in FIG. 5, when the LED array module 44 is disposed adjacent to the first supporting part P1, the content of glass fiber included in the first supporting part P1 may be higher than the content of glass fiber included in one or more of the second to fourth supporting parts P2 to P4. That is, the first supporting part P1 may include glass fiber in a relatively high first content. As such, the thermal stiffness increases, which thereby prevents or minimizes bending or deformations from occurring even with the high heat generating LED array module 44 located adjacent thereto. The second to fourth supporting parts P2 to P4 may include glass fiber in a relatively low second content, which can thus limit or minimize the amount of debris of foreign materials from the glass fiber.

Here, in order to further address the issue of undesired debris creation, an additional solution could be to provide an appropriate protective covering or layer over the support structure surfaces to minimize the chance of glass fibers from breaking off. Alternatively, some sort of surface treatment (e.g., smoothening, grinding, etc.) could be performed for the support structure.

According to another embodiment of the present invention, a content of glass fiber included in the guide panel 30 is differently set for each of the supporting parts P1 to P4 (with for example, at least one supporting part containing no glass fiber whatsoever), and thus, debris or foreign material may be further prevented.

In regard to manufacturing processes, the support structure 30 may be in the form of detachable or separate parts such that the content of glass fiber can be differently set for each part. This will be described below in more detail.

Figure 6:
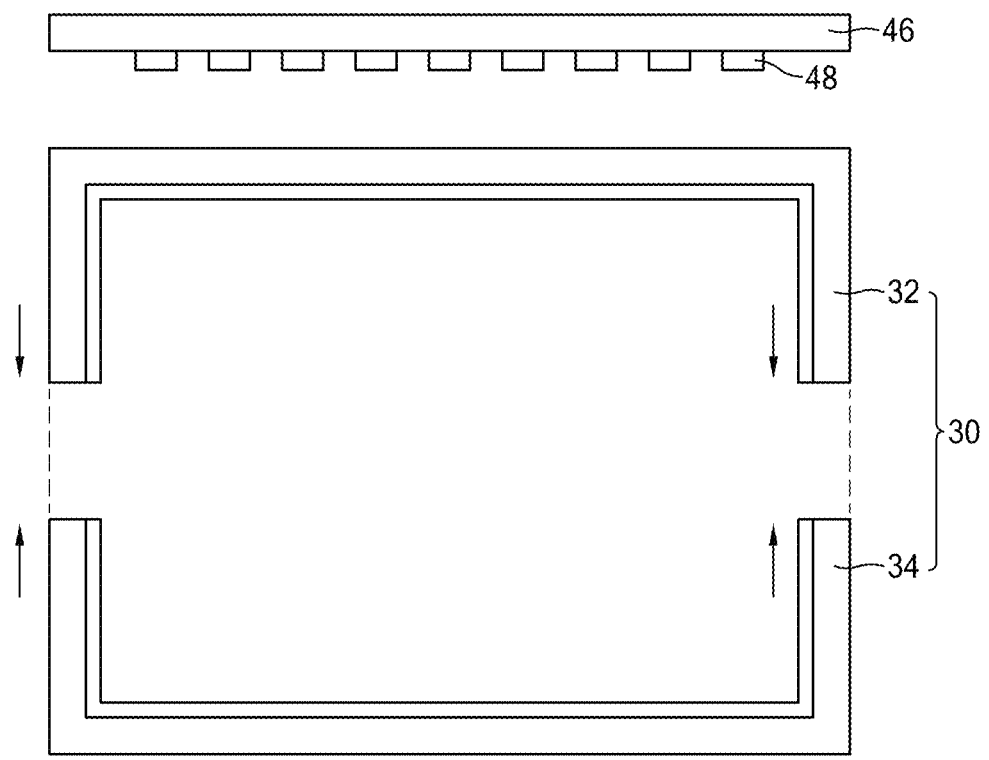
FIG. 6 is a plan view illustrating an example of the support structure according to an embodiment of the present invention.

FIG. 6 is a plan view illustrating an example of the support structure 30 which is a detachable type.

Referring to FIG. 6, the support structure 30 may be divided into a first section 32 and a second section 34 which symmetrically face each other. That is, the third supporting part P3 and the fourth supporting part P4 of the first embodiment are not employed In other words, the first and second sections 32 and 34 may have a bracket-like shape and may be disposed to face each other and assembled together. The content of glass fiber included in the first section 32 may differ from the content of glass fiber included in the second section 34 according to which section being adjacent to the LED array module 44. For example, as illustrated in FIG. 6, when the LED array module 44 (46 and 48) is disposed adjacent to the first section 32, such may include glass fiber in relatively high first content, to thus increase its thermal stiffness. The second section 34 may include glass fiber in relatively low second content to thus decrease the amount of possible debris of foreign materials.

Figure 7:
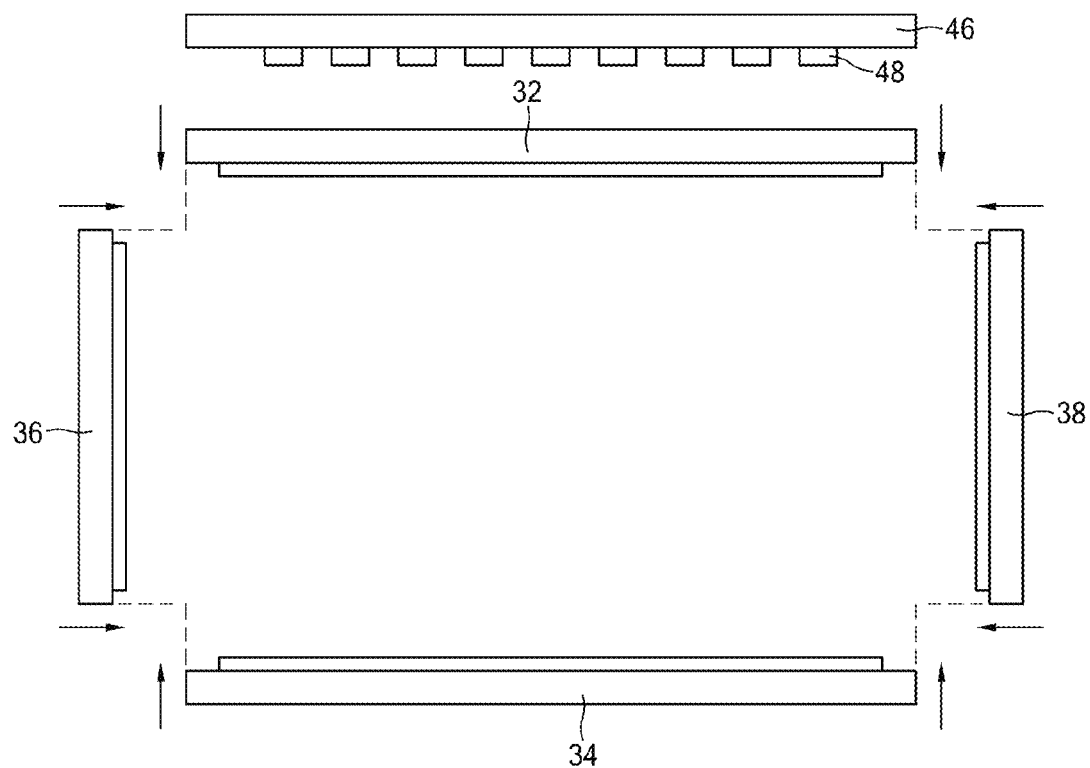
FIG. 7 is a plan view illustrating another example of the support structure according to an embodiment of the present invention.
Figure 8:
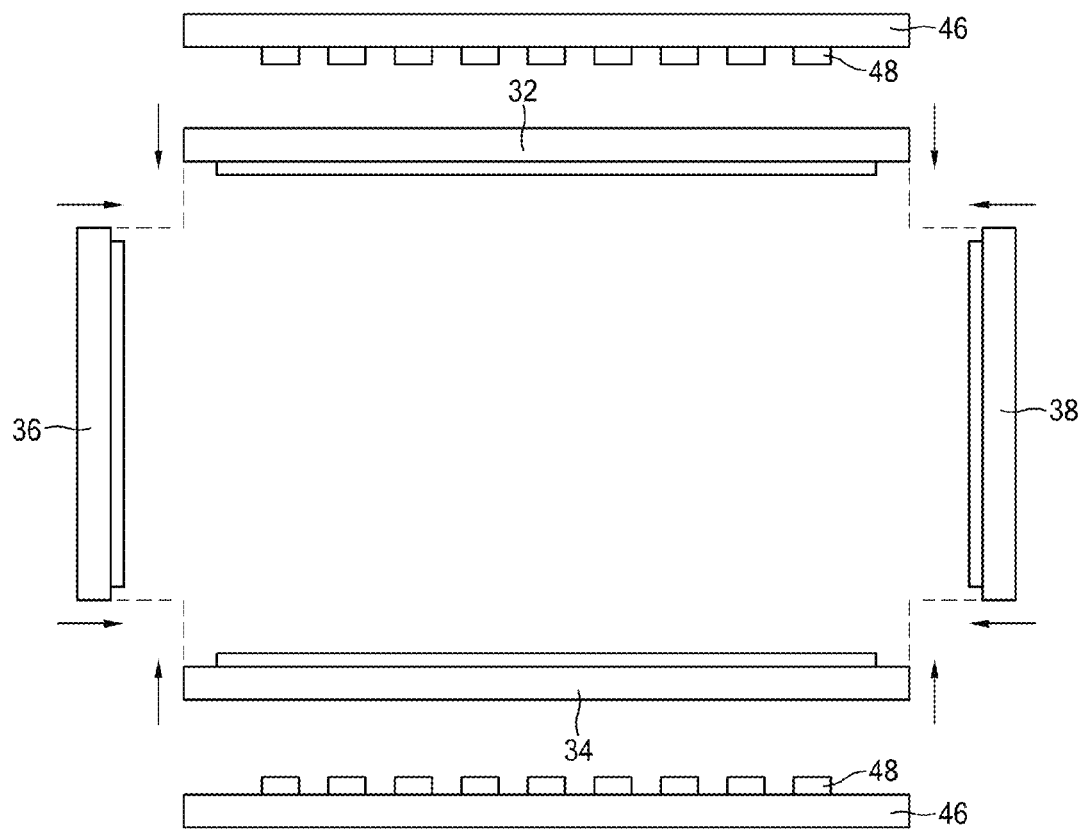
FIG. 8 is a diagram for describing a case where LED array modules are respectively disposed on both sides of the support structure according to an embodiment of the present invention.

FIG. 7 is a plan view illustrating another example of a guide panel 30 which is a detachable type. FIG. 8 is a diagram for describing a case where LED array modules 44 (46 and 48) are respectively disposed on both sides of the support structure 30.

Referring to FIG. 7, the support structure 30 may be divided into four separate parts 32, 34, 36 and 38 in correspondence with the respective borders of the liquid crystal panel 10. That is, the first to fourth supporting parts P1 to P4 may be separate or detached from each other, and thus, the support structure 30 may include the first to fourth parts 32, 34, 36 and 38 which respectively include the first to fourth supporting parts P1 to P4. Therefore, each of the first to fourth parts 32, 34, 36 and 38 may have a bar-like or straight shape that correspond to the respective borders of the liquid crystal panel 10 and form a frame-like shape upon assembly. Contents of respective glass fibers included in the first to fourth parts 32, 34, 36 and 38 may be differently set according to whether such is adjacent to the LED array module 44. For example, as illustrated in FIG. 7, when the LED array module 44 is disposed adjacent to the first part 32, such may include glass fibers at a relatively high first content, and thus, thermal stiffness increases. The second to fourth parts 34, 36 and 38 may include glass fibers at a relatively low second content and thus decreases the amount of debris or foreign materials. Likewise, as illustrated in FIG. 8, when the LED array module 44 (46 and 48) is disposed adjacent to the first and second parts 32 and 34, such may include glass fibers at a relatively high first content, and thus, thermal stiffness increases. The third and fourth parts 36 and 38 may include glass fibers at a relatively low second content and thus decreases the chance of debris or foreign materials from being created.

The first content may be lower than 40 wt %, but higher than or equal to 25 wt %, and the second content may be lower than or equal to 15 wt %. That is, in a region of the support structure 30 adjacent to the LED array module 44, the content of glass fibers may be lower than 40 wt % and higher than or equal to 25 wt %, and in a region of the support structure 30 which is not adjacent to the LED array module 44, the content of glass fibers may be lower than or equal to 15 wt %. This is because when a content of glass fiber included in the support structure 30 is lower than 25 wt %, a thermal stiffness is weakened and thus the support structure 30 may be deformed by heat generated from the LED array module 44. When the content of glass fibers included in the support structure 30 is higher than 15 wt %, the amount of debris or foreign materials which occur because glass fibers fall off from the support structure 30 increases.

As described above, heat-resistant particles (such as glass fibers) are included in the support structure 30 to thus prevent the structure 30 from being deformed by heat generated from the LED array module 44. Also, the content of heat-resistant particles included in the support structure 30 can be differently set (or equally set) for each of the supporting parts, and thus, debris or foreign material is minimized, thereby preventing the reliability of the display device from being degraded.

According to the embodiments of the present invention, the various inventive features can be further described or expressed in the following manner.

Embodiments of the present invention pertain to an apparatus comprising: a supporting structure configured to support a liquid crystal panel; and a heat-resistant material included in at least one particular portion of the supporting structure, the heat-resistant material having characteristics that maintain structural integrity of the support structure despite heat from a backlight.

In such apparatus, the supporting structure comprises first to fourth supporting parts configured to support respective borders of the liquid crystal panel, wherein at least one of the first to fourth supporting parts is adjacent to the backlight, and a content of the heat-resistant material included in the at least one supporting part adjacent to the backlight is higher than a content of the heat-resistant material included in at least one other supporting part.

In such apparatus, the supporting structure has a first section containing the heat-resistant material in a relatively high amount and a second section containing the heat-resistant material in a relatively low amount, the first section being more adjacent to the backlight that the second section.

In such apparatus, an amount of the heat-resistant material is selectively different along portions of the supporting structure, with such amount difference being based upon the structural integrity maintaining effect in view of debris causing effect, whereby a relatively higher amount of the heat-resistant material results in relatively higher structural integrity maintaining effect but relatively higher debris causing effect, and a relatively lower amount of the heat-resistant material result in relatively lower structural integrity maintaining effect but relatively lower debris causing effect.

Also, embodiments of the present invention pertain to a liquid crystal display (LCD) device comprising: a liquid crystal panel; a backlight unit that provides light to the liquid crystal panel from a light source included therein; and a support structure that supports the liquid crystal panel, the support structure having at least one heat-resistant section immediately adjacent to the backlight unit.

In such LCD device, the heat-resistant section is achieved by inclusion of glass fibers at a particular amount based upon a balance to be achieved between structural integrity maintaining effect in view of debris causing effect.

In such LCD device, the heat-resistant section can be achieved by including glass fibers at an amount within a range of at least 25 wt % up to 40 wt %.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus comprising:
a supporting structure configured to support a liquid crystal panel; and
a heat-resistant material included in at least one particular portion of the supporting structure, the heat-resistant material having characteristics that maintain structural integrity of the support structure despite heat from a backlight including a plurality of light sources associated with the liquid crystal panel,
wherein the supporting structure has a first section containing the heat-resistant material in a relatively high amount, and a second section containing the heat-resistant material in a relatively low amount, the first section being more adjacent to each light source than the second section.

2. The apparatus of claim 1, wherein the supporting structure comprises:
first to fourth supporting parts configured to support respective borders of the liquid crystal panel,
wherein at least one of the first to fourth supporting parts is adjacent to the light sources, and a content of the heat-resistant material included in the at least one supporting part adjacent to the light sources is higher than a content of the heat-resistant material included in at least one other supporting part.

3. The apparatus of claim 2, wherein the supporting part adjacent to the light source comprises glass fibers of which a content is lower than 40 wt % and higher than or equal to 25 wt %, and
wherein at least one among the other supporting parts disposed farther away from the light source than the support part adjacent to the light source comprises glass fibers of which a content is lower than or equal to 15 wt %.

4. The apparatus of claim 1, wherein the heat-resistant material includes at least one among a glass fiber, a carbon fiber, and an aramid fiber.

5. The apparatus of claim 1, wherein,
the heat-resistant material of the first section is glass fibers of which a content is lower than 40 wt % and higher than or equal to 25 wt %, and
the heat-resistant material of the second section is glass fibers of which a content is lower than or equal to 15 wt %.

6. The apparatus of claim 1, wherein the first and second sections contain different heat-resistant material contents in consideration of thermal stiffness characteristics in view of minimum debris creation characteristics.

7. A liquid crystal display (LCD) device comprising:
a liquid crystal panel;
a backlight unit including a plurality of light sources that provide light to the liquid crystal panel; and
a support structure that supports the liquid crystal panel,
wherein the support structure comprising a plurality of sections, and at least one heat-resistant section having a heat-resistant material adjacent to each light source, and
wherein a content of the heat-resistant material of the heat-resistant section adjacent to each light source is the highest among the plurality of sections of the support structure.

8. The LCD device of claim 7, wherein the heat-resistant material includes at least one among a glass fiber, a carbon fiber, and an aramid fiber.

9. The LCD device of claim 7, wherein a first section containing the heat-resistant material includes glass fibers at an amount within a range of at least 25 wt % up to 40 wt %.

10. The LCD device of claim 7, wherein the support structure comprises a side wall surrounding side surfaces of the backlight unit, the light sources being disposed at the section of the side wall of the supporting structure having the highest heat-resistant material content.

11. The LCD device of claim 7, wherein,
a first section among the plurality of sections comprises glass fibers of which a content is lower than 40 wt % and higher than or equal to 25 wt %, and
a second section among the plurality of sections comprises glass fibers of which a content is lower than or equal to 15 wt %,
wherein the first section is more adjacent to the light sources than the second section.

12. The LCD device of claim 7, wherein,
the content of the heat-resistant material in the heat-resistant section is determined in consideration of thermal stiffness characteristics, and
the content of the heat-resistant material in the other section is determined in consideration of minimum debris creation characteristics.

13. An apparatus comprising:
a liquid crystal panel;
a backlight unit comprising a light guide panel and a plurality of light sources configured to supply light to the light guide panel so that the light is supplied to the liquid crystal panel; and
a support structure that supports the liquid crystal panel comprising a plurality of sections,
wherein at least one section of the support structure is configured to include a heat-resistant material configured to accommodate heat generated by the plurality of the light sources, and
wherein a content of the heat-resistant material included in each section is selectively different depending upon heat generated by the plurality of the light sources.

14. The apparatus of claim 13, wherein one section among the plurality of sections has relatively higher heat-material content than other sections to improve thermal stiffness characteristics than the other sections.

15. The apparatus of claim 14, wherein another section among the plurality of sections has relatively lower heat-material content than the one section to reduce debris creation characteristics than the one section.

16. The apparatus of claim 13, wherein the heat-resistant material includes at least one among a glass fiber, a carbon fiber, and an aramid fiber.

* * * * *